US012504152B2

(12) United States Patent
Jin et al.

(10) Patent No.: US 12,504,152 B2
(45) Date of Patent: Dec. 23, 2025

(54) LAMP WITH TRANSLATIONALLY ADJUSTABLE LENS

(71) Applicant: Hengdian Group Tospo Lighting Co., Ltd., Zhejiang (CN)

(72) Inventors: Meiling Jin, Jinhua (CN); Jiangen Wei, Jinhua (CN); Zhongyuan Wang, Jinhua (CN); Huannan Wu, Jinhua (CN)

(73) Assignee: Hengdian Group Tospo Lighting Co., Ltd., Jinhua (CN)

( * ) Notice: Subject to any disclaimer, the term of this patent is extended or adjusted under 35 U.S.C. 154(b) by 0 days.

(21) Appl. No.: 18/882,506

(22) Filed: Sep. 11, 2024

(65) Prior Publication Data

US 2025/0084983 A1 Mar. 13, 2025

(30) Foreign Application Priority Data

Sep. 11, 2023 (CN) ......................... 202311174012.1

(51) Int. Cl.

*F21V 14/06* (2006.01)
*F21V 5/00* (2018.01)
*F21V 17/02* (2006.01)
*F21V 31/00* (2006.01)
*F21Y 105/16* (2016.01)
*F21Y 115/10* (2016.01)

(52) U.S. Cl.

CPC .............. *F21V 14/06* (2013.01); *F21V 5/007* (2013.01); *F21V 17/02* (2013.01); *F21V 31/005* (2013.01); *F21Y 2105/16* (2016.08); *F21Y 2115/10* (2016.08)

(58) Field of Classification Search

CPC .......... F21V 14/06; F21V 17/02; F21V 5/007; F21V 5/04; F21Y 2115/10

See application file for complete search history.

(56) References Cited

U.S. PATENT DOCUMENTS 4,164,012 A * 8/1979 Gulliksen ............... F21V 14/06 362/292
4,293,892 A * 10/1981 Plummer ................ F21V 14/06 362/17
7,896,521 B2 * 3/2011 Becker .................... F21V 14/06 362/240
7,896,524 B2 * 3/2011 Yoneda ................... F21V 14/06 362/245
8,262,252 B2 * 9/2012 Bergman ................ F21V 14/06 362/232
10,125,953 B2 * 11/2018 Quadri .................... F21V 14/06
10,901,227 B2 * 1/2021 Jesurun .................... F21V 14/06
11,149,920 B2 * 10/2021 Bremerich .............. F21V 14/06
11,353,195 B2 * 6/2022 Lang ....................... F21V 14/04

(Continued)

*Primary Examiner* — Ismael Negron
(74) *Attorney, Agent, or Firm* — LOZA & LOZA, LLP; Michael Fedrick

(57) ABSTRACT

A lamp including a lamp body, a light source plate provided in the lamp body and having a plurality of LED lamp beads; a lens plate provided above the light source plate and having several rows of dimming lenses; a surface cover located above the lens plate and connected to the lamp body; and adjustment knobs configured to adjust a position of the lens. The lens plate may be moved by rotating the adjustment knobs so that the position of the dimming lenses relative to the LED lamp beads is changed, thereby adjusting the light-emitting angle of the lamp.

7 Claims, 3 Drawing Sheets

(56) References Cited

U.S. PATENT DOCUMENTS

| | | | | |
|---|---|---|---|---|
| 11,754,261 | B2 * | 9/2023 | Smets | F21V 14/06<br>362/282 |
| 2018/0087748 | A1 * | 3/2018 | Gladden | F21V 14/06 |
| 2019/0203909 | A1 * | 7/2019 | Heemstra | F21V 14/06 |
| 2021/0172585 | A1 * | 6/2021 | Boonekamp | F21V 14/06 |

* cited by examiner

LAMP WITH TRANSLATIONALLY ADJUSTABLE LENS

CROSS-REFERENCE TO RELATED APPLICATION

This application claims priority to Chinese patent application No. 202311174012.1, filed Sep. 11, 2023, the entirety of which are herein incorporated by reference.

FIELD OF THE INVENTION

The present disclosure belongs to the technical field of lamps, and particularly relates to a lamp capable of translational adjustment of a light-emitting angle and an implementation method thereof.

BACKGROUND OF THE INVENTION

Currently, outdoor products for export are undergoing an inventory reduction innovation. The large number of models and specifications has led to increasing inventory pressure for intermediaries and buyers, making it difficult to allocate products and resulting in large turnover maintenance and storage costs. In this context, reducing the inventory model has become the trend of product development in the past two years. For a product, adjusting different color temperatures, adjusting different powers, and replacing lenses are common methods at this stage.

On the basis of realizing the model reduction, reducing the cost will be the focus of the product in the future. The increased unit price of products due to stacking functions requires breakthrough solutions to minimize.

In the past, in the lens part, various lenses with different light-emitting angles were incorporated into a single product, and lenses were assembled based on actual usage requirements, while the remaining lenses of other angles were discarded, leading to waste.

SUMMARY OF THE INVENTION

It is an object of the present disclosure to provide a lamp capable of translational adjustment of a light-emitting angle so as to solve the problems set forth in the above background. The present disclosure provides a lamp capable of translational adjustment of a light-emitting angle, with the feature of facilitating the adjustment of a light-emitting angle.

Another object of the present disclosure is to provide an implementation method of the lamp capable of translational adjustment of a light-emitting angle.

In order to achieve the above-mentioned object, the present disclosure provides the following technical solution. A lamp capable of translational adjustment of a light-emitting angle is provided, including a lamp body, where a light source plate is installed inside the lamp body, and a translatable lens is provided above the light source plate; several rows of dimming lenses with different light-emitting angles are provided on the lens along a translation direction alternately; a surface cover located above the lens is connected to the lamp body, and adjustment knobs configured to adjust a position of the lens are installed on two sides of the lamp body.

Further, in order to install the adjustment knobs, two sides of the lamp body are arranged with installation grooves configured for insertion of the adjustment knobs. The adjustment knob is installed on the lamp body through an installation sleeve.

Further, in order to translate the lens, two sides of the lens are provided with symmetrical racks, and a circumference of the adjustment knob is provided with a ring gear engaging with the rack.

Further, in order to increase the friction force between the adjustment knob and a finger and make the rotation of the adjustment knob more convenient, the circumference of the adjustment knob is also provided with several protrusions.

Further, in order to not only ensure the waterproofing of the whole lamp, but also generate a friction force between the lens and the lamp body so that the lens does not move in a natural state, a periphery of a back surface of the lens is arranged with a sealing groove, and a sealing ring is connected inside the sealing groove.

Further, in order to facilitate a quick determination of the adjusted light-emitting angle, indication marks are provided above the surface cover, and corresponding indication arrows are provided on the lens.

Further, in the present disclosure, an implementation method of the lamp capable of translational adjustment of a light-emitting angle is provided, including the steps of:

(1) connecting a surface cover to a lamp body through screws to press a lens on a surface of the lamp body;

(2) under the action of a sealing ring, not only ensuring the waterproofing of the whole lamp, but also generating a friction force between the lens and the lamp body so that the lens does not move in a natural state; and (3) when it is necessary to adjust a light-emitting angle, moving the lens by rotating adjustment knobs so that corresponding dimming lenses correspond to the LED lamp beads on a light source plate, thereby adjusting the light-emitting angle.

Compared with the related art, the beneficial effects of the present disclosure are as follows.

1. In the present disclosure, several rows of dimming lenses with three different light-emitting angles are provided on the lens along the translation direction, and the lens may be moved by rotating the adjustment knobs so that the dimming lenses with corresponding light-emitting angles correspond to LED lamp beads on the light source plate, thereby achieving the adjustment of the light-emitting angle without the waste of redundant lenses, and thus reducing the cost of adjusting the light-emitting angle.

2. In the present disclosure, two sides of the lens are provided with symmetrical racks, and the circumference of the adjustment knob is provided with the ring gear engaging with the rack. The lens may be translated by rotating the adjustment knobs so that the adjustment of the lens is more convenient.

3. In the present disclosure, the circumference of the adjustment knob is also provided with several protrusions, thereby increasing the friction force between the adjustment knob and the finger and making the rotation of the adjustment knob more convenient.

4. In the present disclosure, the periphery of the back surface of the lens is arranged with the sealing groove, and the sealing ring is connected inside the sealing groove, thereby under the action of the sealing ring, not only ensuring the waterproofing of the whole lamp, but also generating a friction force between the lens and the lamp body so that the lens does not move in the natural state.

5. In the present disclosure, the indication marks are provided above the surface cover, and the corresponding indication arrows are provided on the lens, thereby facilitating a quick determination of the adjusted light-emitting angle.

Figure 1:
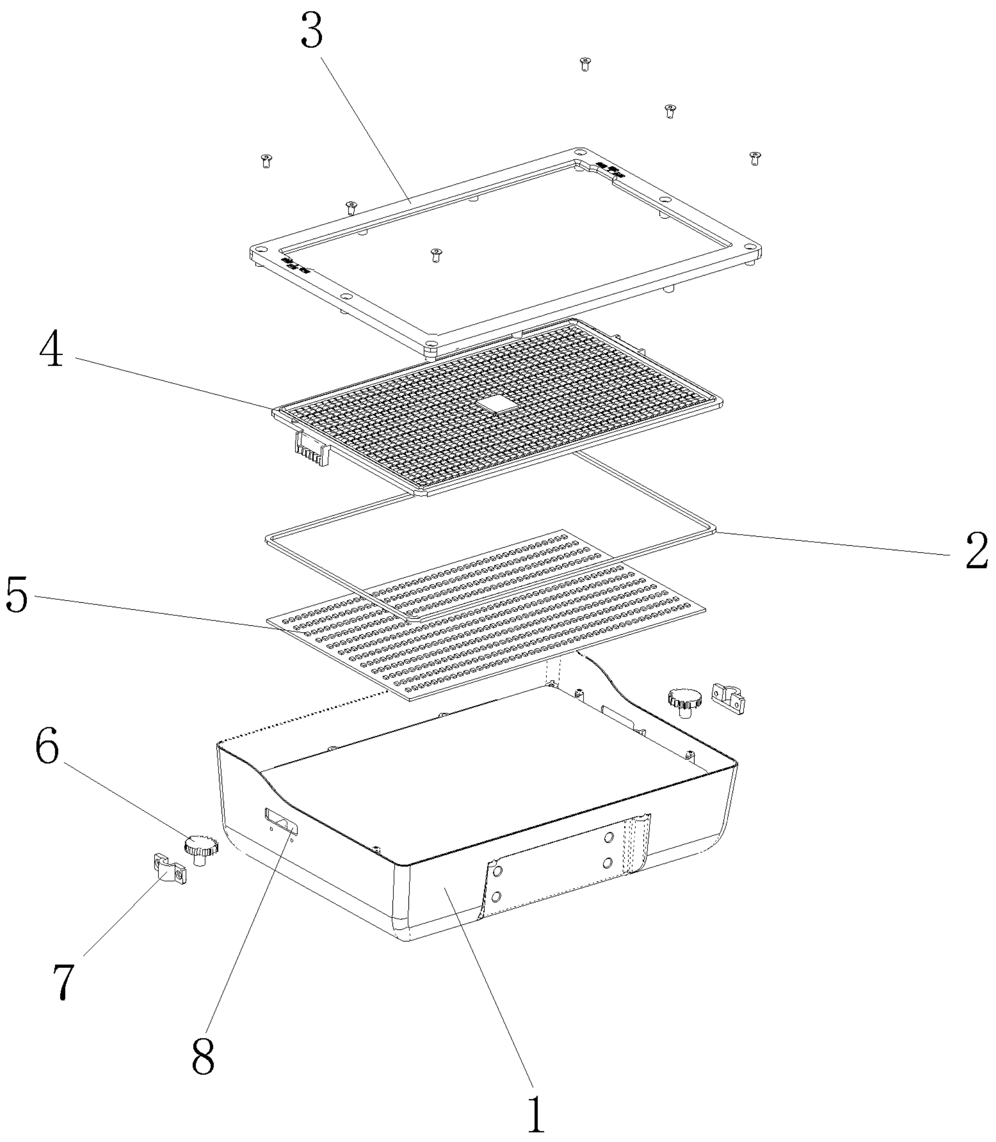
FIG. 1 is an exploded structural schematic diagram of the present disclosure.

In the drawings: 1—lamp body; 2—sealing ring; 3—surface cover; 31—indication mark; 4—lens plate; 41—dimming lens; 42—indication arrow; 43—rack; 44—sealing groove; 5—light source plate; 6—adjustment knob; 61—protrusion; 62—ring gear; 7—installation sleeve; and 8—installation groove.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only some embodiments of the present disclosure, not all embodiments. Based on the embodiments of the present disclosure, all other embodiments obtained by a person skilled in the art without inventive effort fall within the scope of the present disclosure.

Embodiment 1

Figure 2:
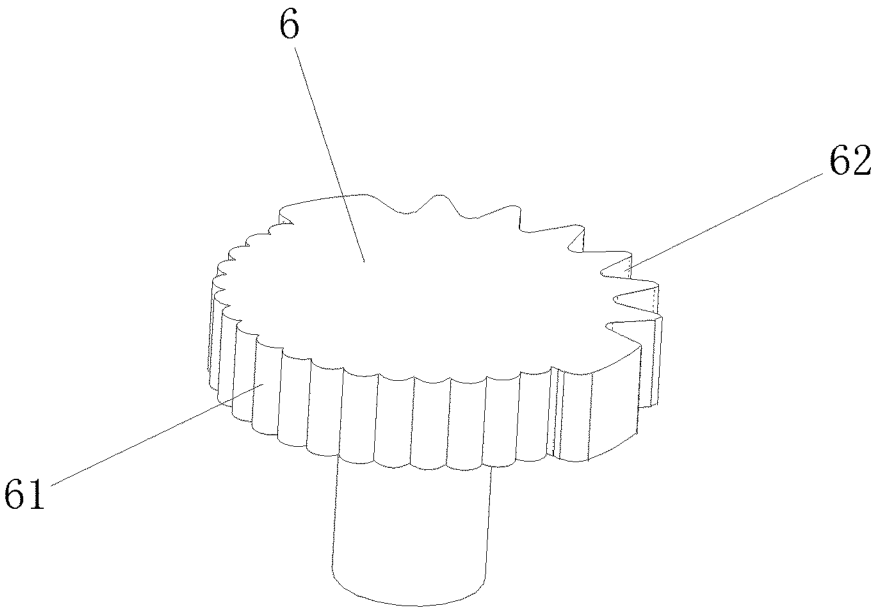
FIG. 2 is a schematic structural diagram of an adjustment knob of the present disclosure.
Figure 3:
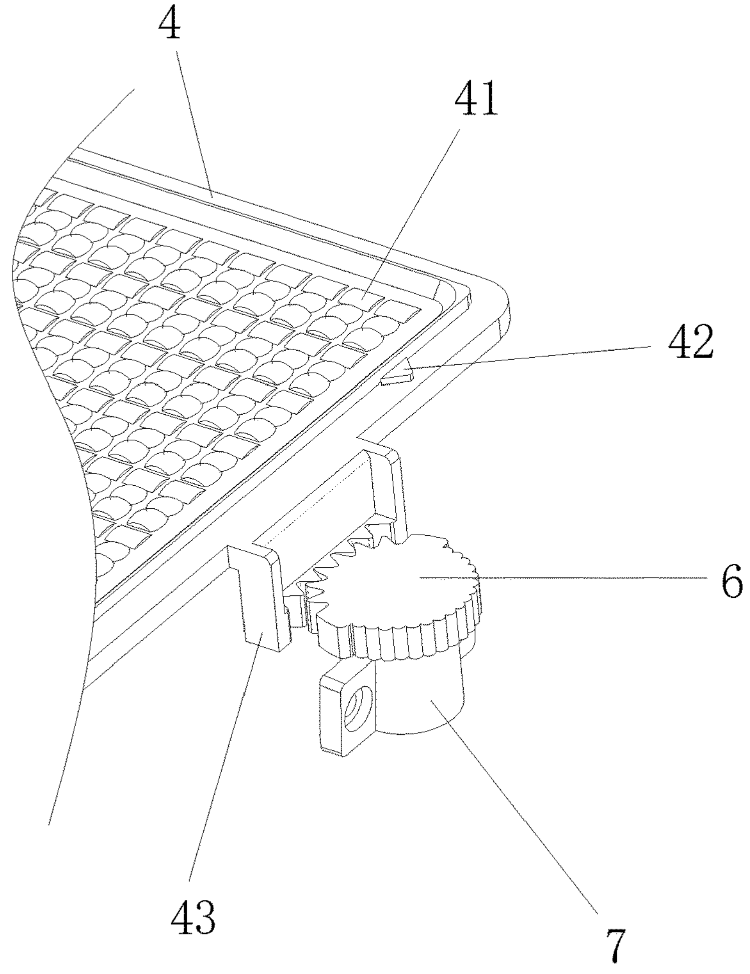
FIG. 3 is a schematic structural diagram showing the connection of an adjustment knob and a lens of the present disclosure.
Figure 4:
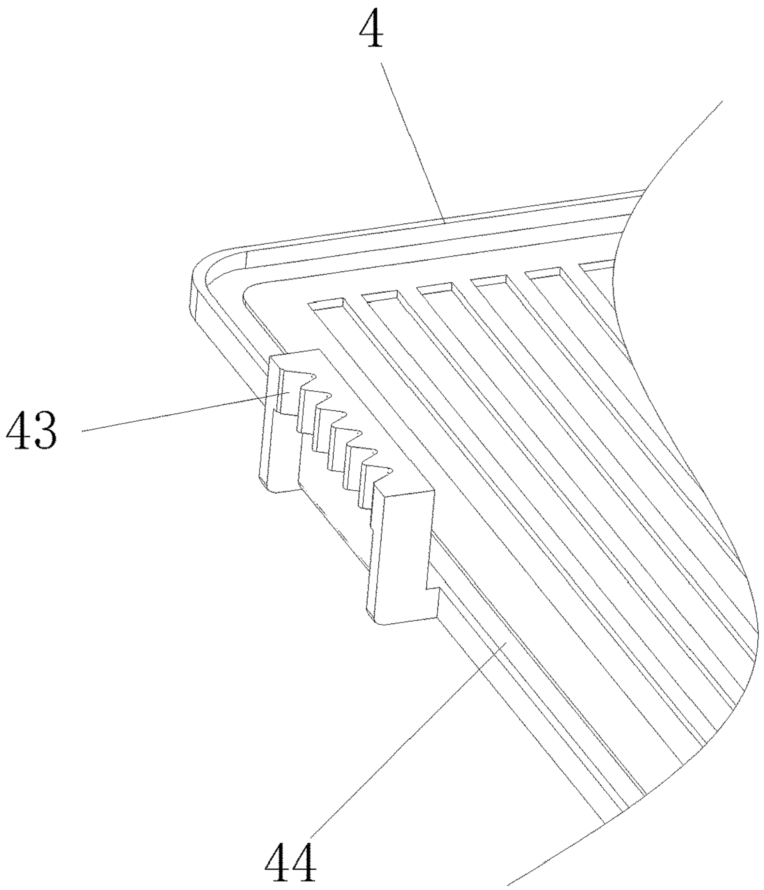
FIG. 4 is a schematic structural diagram of a back surface of a lens of the present disclosure.
Figure 5:
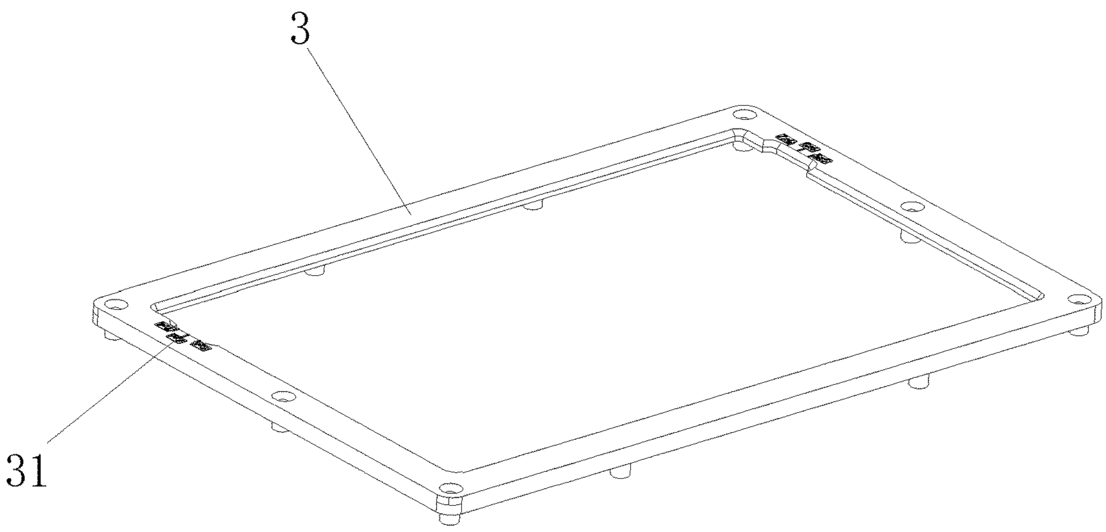
FIG. 5 is a schematic structural diagram of a surface cover of the present disclosure.

Referring to FIGS. 1-5, the present disclosure provides the following technical solution. A lamp capable of translational adjustment of a light-emitting angle is provided, including a lamp body 1. A light source plate 5 is installed inside the lamp body 1, and a lens plate 4, which is translatable, is provided above the light source plate 5. Several rows of dimming lenses 41 with different light-emitting angles are provided on the lens plate 4 along a translation direction alternately. A surface cover 3 located above the lens plate 4 is connected to the lamp body 1, and adjustment knobs 6 configured to adjust a position of the lens plate 4 are installed on two sides of the lamp body 1.

According to the above-mentioned technical solution, in the present disclosure, several rows of dimming lenses 41 with three different light-emitting angles are provided on the lens plate 4 along the translation direction, and the lens plate 4 may be moved by rotating the adjustment knobs 6 so that the dimming lenses 41 with corresponding light-emitting angles correspond to LED lamp beads on the light source plate 5, thereby achieving the adjustment of the light-emitting angle without the waste of redundant lenses, and thus reducing the cost of adjusting the light-emitting angle.

Specifically, two sides of the lamp body 1 are arranged with installation grooves 8 configured for insertion of the adjustment knobs 6. The adjustment knob 6 is installed on the lamp body 1 through an installation sleeve 7.

According to the above-mentioned technical solution, the adjustment knob 6 is installed.

Specifically, racks 43 are symmetrically provided at two sides of the lens plate 4, and a circumference of the adjustment knob 6 is provided with a ring gear 62 engaging with the rack 43.

According to the above-mentioned technical solution, the lens 4 may be translated by rotating the adjustment knobs 6.

Specifically, the circumference of the adjustment knob 6 is also provided with several protrusions 61.

According to the above-mentioned technical solution, the friction force between the adjustment knob 6 and the finger is increased so that the rotation of the adjustment knob 6 is more convenient.

Embodiment 2

This embodiment differs from embodiment 1 in that: specifically, a periphery of a back surface of the lens plate 4 is arranged with a sealing groove 44, and a sealing ring 2 is connected inside the sealing groove 44.

According to the above-mentioned technical solution, under the action of a sealing ring 2, not only the waterproofing of the whole lamp is ensured, but also a friction force between the lens plate 4 and the lamp body 1 is generated so that the lens plate 4 does not move in a natural state.

Embodiment 3

This embodiment differs from embodiment 1 in that: specifically, indication marks 31 are provided above the surface cover 3, and corresponding indication arrows 42 are provided on the lens plate 4.

According to the above-mentioned technical solution, it is convenient to quickly determine the adjusted light-emitting angle.

Embodiment 4

Further, the implementation method of the lamp capable of translational adjustment of a light-emitting angle according to the present disclosure includes the steps of:

(1) connecting a surface cover 3 to a lamp body 1 through screws to press a lens plate 4 on a surface of the lamp body 1;

(2) under the action of a sealing ring 2, not only ensuring the waterproofing of the whole lamp, but also generating a friction force between the lens plate 4 and the lamp body 1 so that the lens plate 4 does not move in a natural state; and (3) when it is necessary to adjust a light-emitting angle, moving the lens plate 4 by rotating adjustment knobs 6 so that corresponding dimming lenses 41 correspond to the LED lamp beads on a light source plate 5, thereby adjusting the light-emitting angle.

In summary, in the present disclosure, several rows of dimming lenses 41 with three different light-emitting angles are provided on the lens plate 4 along the translation direction, and the lens plate 4 may be moved by rotating the adjustment knobs 6 so that the dimming lenses 41 with corresponding light-emitting angles correspond to LED lamp beads on the light source plate 5, thereby achieving the adjustment of the light-emitting angle without the waste of redundant lenses, and thus reducing the cost of adjusting the light-emitting angle. Racks 43 are symmetrically provided at two sides of the lens plate 4, and the circumference of the adjustment knob 6 is provided with the ring gear 62 engaging with the rack 43. The lens plate 4 may be translated by rotating the adjustment knobs 6 so that the adjustment of the lens plate 4 is more convenient. The circumference of the adjustment knob 6 is also provided with several protrusions 61, thereby increasing the friction force between the adjustment knob 6 and the finger and making the rotation of the adjustment knob 6 more convenient. The periphery of the back surface of the lens plate 4 is arranged with the sealing groove 44, and the sealing ring 2 is connected inside the sealing groove 44, thereby under the action of the sealing ring 2, not only ensuring the waterproofing of the whole lamp, but also generating a friction force between the lens plate 4 and the lamp body 1 so that the lens 4 does not move in the natural state. The indication marks 31 are provided above the surface cover 3, and the corresponding indication arrows 42 are provided on the lens plate 4, thereby facilitating a quick determination of the adjusted light-emitting angle.

While embodiments of the present disclosure have been shown and described, it will be understood by a person skilled in the art that various changes, modifications, substitutions, and alterations may be made herein without departing from the principles and spirit of the present disclosure, and the scope of the present disclosure is defined by the appended claims and their equivalents.

The invention claimed is:

1. A lamp comprising:

a lamp body;

a light source plate installed inside the lamp body;

a lens plate provided above the light source plate;

a plurality of rows of dimming lenses with different light-emitting angles provided on the lens plate, wherein the plurality of rows of dimming lenses comprises one or more rows of first dimming lenses having a first light-emitting angle, one or more rows of second dimming lenses having a second light-emitting angle, and one or more rows of third dimming lenses having a third light-emitting angle, and wherein the first light-emitting angle, the second light-emitting angle and the third light-emitting angle are different from each other;

a surface cover located above the lens plate and is connected to the lamp body, wherein the surface cover is configured to press the lens plate on a surface of the lamp body;

adjustment knobs provided on two sides of the lamp body and configured to adjust a position of the lens plate relative to the light source plate;

a sealing groove arranged on a periphery of a back surface of the lens plate; and a sealing ring connected inside the sealing groove and configured to generate a friction force between the lens plate and the lamp body, thereby preventing the lens plate from moving in a natural state.

2. The lamp according to claim 1, further comprising installation grooves provided on two sides of the lamp body and configured for insertion of the adjustment knobs.

3. The lamp according to claim 1, further comprising an installation groove configured to receive the adjustment knob.

4. The lamp according to claim 1, further comprising indication marks provided above the surface cover, and corresponding indication arrows provided on the lens plate.

5. An implementation method of the lamp according to claim 1, comprising the steps of:

(1) connecting a surface cover to a lamp body using screws to press a lens on a surface of the lamp body;

(2) under the action of a sealing ring, not only ensuring the waterproofing of the whole lamp, but also generating a friction force between the lens and the lamp body so that the lens does not move in a natural state; and (3) moving the lens by rotating adjustment knobs so that corresponding dimming lenses correspond to the LED lamp beads on a light source plate, thereby adjusting the light-emitting angle, when required.

6. The lamp according to claim 1, further comprising symmetrical racks provided at two sides of the lens plate, and a ring gear provided on a circumference of the adjustment knob and engaging with the rack.

7. The lamp according to claim 6, further comprising several protrusions provided on the circumference of the adjustment knob.

* * * * *